United States Patent Office 2,830,063
Patented Apr. 8, 1958

2,830,063

3β-CYCLOALKYLACYLOXY - 17β - HYDROXY - 17α-ETHYNYL - 5 - ANDROSTENES AND ANDROSTANES AND THEIR PREPARATION

Raymond O. Clinton, North Greenbush Township, and Arthur L. Beyler, Albany, N. Y., assignors to Sterling Drug Inc., New York, N. Y., a corporation of Delaware No Drawing. Application July 21, 1955
Serial No. 523,612

20 Claims. (Cl. 260—397.5)

This invention relates to new 3β - cycloalkylacyloxy-17β - hydroxy - 17α - ethynylandrostanes and 3β - cycloalkylacyloxy - 17β - hydroxy - 17α - ethynyl - 5 - androstenes which have pituitary inhibitory activity without proportionate concomitant estrogenicity or androgenicity.

Of the several hormones secreted by the pituitary gland two produce certain structural and secretory changes in the gonads. These two gonadotropins are the follicle-stimulating hormone (FSH) and the interstitial cell-stimulating hormone (ICSH). In the male the FSH stimulates the tests to develop sex cells, while the ICSH brings about production of the testicular hormone. In the female FSH brings about the growth of the Graafian follicle while the ICSH stimulates ovulation, development of corpus luteum and the production of progesterone. Thus any agent which interferes with the pituitary secretion of FSH and ICSH will perforce affect the development and endocrine function of the testes and ovaries. Such an agent is useful in the treatment of endocrinological disturbances such as menopausal syndrome, endometriosis, postpartum breast engorgement, benign prostatic hypertrophy, functional uterine bleeding, chronic cystic mastitis and suppression or termination of reproductive processes.

The steroidal hormones, estradiol and testosterone, are pituitary inhibitors but their use leads to very undesirable effects such as feminization and masculinization respectively, and in other ways creating a sexual imbalance. Thus, for these steroidal hormones, the ratio of the pituitary inhibition (anti-FSH and anti-ICSH) to the estrogenic or androgenic activity is low due to the fact that the pituitary elaboration of gonadotropin is inhibited but the sex accessory organs are stimulated.

Our new compounds are much more specific than the steroidal hormones as pituitary inhibitors because of their low estrogenic and androgenic activity. The estrogenic activity of our new compounds varies from 1/10,000 to 1/50,000 that of estradiol and the androgenic acivity is of such a low order that it can not be measured unless doses, much too high to have physiological significance, are used. Therefore, the ratio of the anti-FSH or anti-ICSH activity to the estrogenic and androgenic activity is high and hence the compounds have a much higher degree of specificity as pituitary inhibitors. The elaboration of gonadotropins is inhibited to such an extent that nearly maximal atrophy of the sex organs results.

The compounds can be administered by intramuscular injection of 50 mg./cc. sterile aqueous or saline suspensions containing 1:10,000 parts of hexylresorcinol. Intramuscular injection of a 40 mg./cc. solution of the compounds in a vegetable oil such as cottonseed oil can be used if desired. Alternatively, the compounds can be administered orally as 25 mg. capsules or tablets. The compounds are active at a level of 0.2-5 mg./kg. body weight.

The compounds of the invention are new mono esters of 17α -ethynylandrostane - 3β,17β - diol having the formula

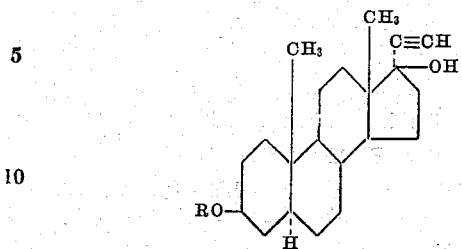

and of 17α - ethynyl - 5 - androstene - 3β,17β - diol having the formula

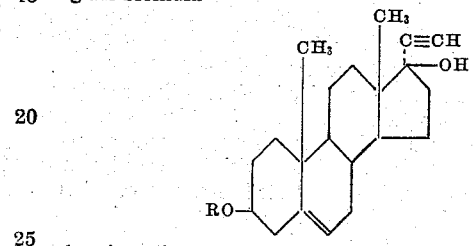

wherein R is a 5-6-membered cycloalkylalkanoyl radical having from 1 to about 8 carbon atoms in the alkanoyl portion. The invention also relates to a method for preparation of these new compounds.

In the above general formulas, R is a cycylolkylalkanoyl radical wherein the cycloalkyl group is a 5-6-membered ring which can be substituted by lower-alkyl groups and the alkanoyl portion of the radical has from 1 to about 8 carbon atoms. Thus R can be cycloalkylalkanoyl radicals such as cyclohexylformyl, cyclopentylformyl, cyclopentylacetyl, β - cyclohexylpropionyl, α - cyclohexylpropionyl, γ - cyclopentylbutyryl, β - cyclopentylbutyryl, cyclohexylisobutyryl, δ - (2 - methylcyclohexyl)valeryl, γ - cyclohexylcaproyl, ω - (3 - ethylcyclopentyl)caproyl, ω - cyclohexylheptanoyl, ω - cyclopentyloctanoyl and the like.

Our new compounds are prepared by esterification of 17α - ethynylandrostane - 3β,17β - diol and 17α - ethynyl-5 - androstene - 3β,17β - diol with a cycloalkylalkanoic acylating agent such as the appropriate cycloalkylalkanoic acid anhydride or acid halide under anhydrous conditions. The mono esters thus obtained are readily purified by crystallization or chromatographic separation on silica gel. The hydroxyl group in the 3-position is esterified before the same group in the 17-position because the former is a secondary alcohol whereas the latter is a tertiary alcohol. A hydroxyl group at the 17-position, which also carries a further substituent, is sterically hindered and hence less reactive than the unhindered 3-hydroxyl group. Since diester formation proceeds at a much slower rate due to steric hindrance, the reaction can be carried out under conditions which afford the mono esters in good yields.

In practicing our invention, we prefer to esterify the appropriate diol with an acid anhydride at room temperature under anhydrous conditions. After standing for 24–36 hours, the reaction mixture is quenched in water or dilute acid to give the mono esters in efficiencies of 80–90%. Under these conditions, any diester formation is suppressed to such an extent that a simple recrystallization is all that is necessary for obtention of pure mono esters. Although solutions of the mono esters containing some of the corresponding diester can be used, it is preferable to use the pure compounds in therapy.

The desired compounds can also be obtained by passage of the quenched reaction mixtures, resulting from the action of an acid anhydride or acid chloride on the appropriate diol, through a chromatographic column. Due to their greater solubility in the eluting mixture, any diester is eluted first from the column first and may be recovered if desired. The mono esters are obtained by evaporation of the subsequent eluates.

When more vigorous conditions, such as refluxing the reaction mixtures for longer periods of time, are employed the diesters can be obtained as the major product as illustrated in Example 12.

The following examples will further illustrate the invention without limiting the invention thereto.

EXAMPLE 1

$3\beta$ - ($\beta$ - cyclohexylpropionoxy) - $17\beta$ - hydroxy - $17\alpha$-ethynyl-5-androstene A mixture of 3.1 g. of 17α-ethynyl-5-androstene-3β,17β-diol and 5.9 g. of β-cyclohexylpropionic anhydride in 25 ml. of pure, dry pyridine was heated on a steam bath for one hour under anhydrous conditions. The resulting solution was poured into a mixture of 700 g. of ice, 17 ml. of concentrated sulfuric acid and 300 ml. of water and the suspension thus obtained left standing for fourteen hours at room temperature. The mixture was extracted with ether and the ethereal extract washed with dilute sodium bicarbonate solution, dried over anhydrous magnesium sulfate and concentrated to a volume of 100 ml. After dilution with 400 ml. of n-pentane, the solution was chromatographed on 200 g. of silica gel using successive 500 ml. portions of 20% ether-80% n-pentane as eluate. Evaporation of the combined solution of the seventh through the eleventh portions gave a crystalline solid which was recrystallized there times from n-hexane to yield 2.10 g. of 3β-(β-cyclohexylpropionoxy)-17β-hydroxy-17α-ethynyl-5-androstene, M. P. 115.2–116.6° C. (corr.); $[\alpha]_D^{25} = -83.8° \pm 0.2°$ (1% in chloroform).

*Analysis.*—Calcd. for $C_{30}H_{44}O_3$: C, 79.60; H, 9.80. Found: C, 79.74; H, 9.67.

EXAMPLE 2

$3\beta$ - cyclohexylacetoxy - $17\beta$ - hydroxy - $17\alpha$ - ethynyl-5-androstene was prepared from 3.14 g. of 17α-ethynyl-5-androstene-3β,17β-diol and 5.33 g. of cyclohexylacetic anhydride in 25 ml. of dry pyridine according to the method described in Example 1. The 3β-cyclohexylacetoxy-17β - hydroxy - 17α - ethynyl - 5 - androstene weighed 2.11 g. and had the M. P. 191.8–194.8° C. (corr.); $[\alpha]_D^{25} = -83.6° \pm 0.2°$ (1% in chloroform).

*Analysis.*—Calcd. for $C_{29}H_{42}O_3$: C, 79.40; H, 9.65. Found: C, 79.24; H, 9.70.

EXAMPLE 3

$3\beta$ - ($\omega$ - cyclohexylvaleroxy) - $17\beta$ - hydroxy - $17\alpha$-ethynyl-5-androstene was prepared from 3.14 g. of 17α-ethynyl-5-androstene-3β,17β-diol and 7.01 g. of ω-cyclohexylvaleric anhydride in 25 ml. of dry pyridine according to the method described in Example 1. The 2.60 g. of 3β - (ω - cyclohexylvaleroxy) - 17β - hydroxy - 17α - ethynyl-5-androstene thus obtained had the M. P. 98.0–101.8° C. (corr.); $[\alpha]_D^{25} = -79.5° \pm 0.3°$ (1% in chloroform).

*Analysis.*—Calcd. for $C_{32}H_{48}O_3$: C, 79.95; H, 10.07. Found: C, 80.15; H, 9.88.

EXAMPLE 4

$3\beta$ - ($\omega$ - cyclohexylcaproxy) - $17\beta$ - hydroxy - $17\alpha$-ethynyl-5-androstene was prepared from 3.14 g. of 17α-ethynyl-5-androstene-3β,17β-diol and 7.57 g. of ω-cyclohexylcaproic anhydride according to the method described in Example 1. The 3β-(ω-cyclohexylcaproxy)-17β-hydroxy-17α-ethynyl-5-androstene thus obtained weighed 2.58 g., M. P. 106.2–107.0° C. (corr.)

$$[\alpha]_D^{25} = -72.7° \pm 0.3°$$

(1% in chloroform).

*Analysis.*—Calcd. for $C_{33}H_{50}O_3$: C, 80.11; H, 10.19. Found: C, 80.40; H, 10.42.

EXAMPLE 5

$3\beta$ - ($\omega$ - cyclohexylcaproxy) - $17\beta$ - hydroxy - $17\alpha$ ethynylandrostane A solution of 4.0 g. of 17α-ethynylandrostane-3β,17β-diol and 9.6 g. of ω-cyclohexylcaproic anhydride in 25 ml. of dry pyridine was allowed to stand at 25–32° C. for twenty-four hours while protected from moisture. The resulting solution was poured into a mixture of 700 g. of ice, 16 ml. of concentrated sulfuric acid and 300 ml. of water. After standing for one hour, the solid product which separated was removed by filtration, washed with sodium carbonate solution then with water and dried in a vacuum desiccator. After recrystallization from dilute alcohol and from Skellysolve C, 2.05 g. of 3β - (ω - cyclohexylcaproxy) - 17β - hydroxy - 17α-ethynylandrostane, M. P. 83.6–85.4° C. (corr.) was obtained; $[\alpha]_D^{25} = -28.5° \pm 0.4°$ (1% in chloroform).

*Analysis.*—Calcd. for $C_{33}H_{52}O_3$: C, 79.78; H, 10.55. Found: C, 79.68; H, 10.83.

EXAMPLE 6

$3\beta$ - cyclohexylcarboxy - $17\beta$ - hydroxy - $17\alpha$ - ethynylandrostane was prepared from 4.09 g. of 17α-ethynylandrostane-3β,17β-diol and 3.91 g. of cyclohexylcarboxylic anhydride in 25 ml. of pyridine according to the method described in Example 5. There was thus obtained 3.10 g. of 3β-cyclohexylcarboxy-17β-hydroxy-17α-ethynylandrostane, M. P. 201.6–203.6° C. (corr.); $[\alpha]_D^{25} = -30.4° \pm 0.4°$ (1% in chloroform).

*Analysis.*—Calcd. for $C_{28}H_{42}O_3$: C, 78.82; H, 9.92. Found: C, 78.94; H, 10.20.

EXAMPLE 7

$3\beta$ - ($\beta$ - cyclohexylpropionoxy) - $17\beta$ - hydroxy - $17\alpha$-ethynylandrostane was prepared from 4.09 g. of 17α-ethynylandrostane-3β,17β-diol and 7.46 g. of β-cyclohexylpropionic anhydride in 25 ml. of pyridine according to the method described in Example 5. The 2.20 g. of 3β - (β - cyclohexylpropionoxy) - 17β - hydroxy - 17α-ethynylandrostane thus obtained had the M. P. 91.8–94.2° C. (corr.); $[\alpha]_D^{25} = -30.4° \pm 0.4°$ (1% in chloroform).

*Analysis.*—Calcd. for $C_{30}H_{46}O_3$: C, 79.24; H, 10.20; O, 10.6. Found: C, 79.60; H, 10.12; O, 10.6.

EXAMPLE 8

$3\beta$ - ($\gamma$ - cyclohexylbutyroxy) - $17\beta$ - hydroxy - $17\alpha$ - ethynyl-5-androstene A solution ofg 3.14 g. of 17α-ethynyl-5-androstene-3β,17β-diol and 6.45 g. of γ-cyclohexylbutyric anhydride in 25 ml. of pure, dry pyridine was kept at 25–30° C. for sixty-five hours. The solution was poured into 750 ml. of cold water and, after standing for two hours, the mixture was thoroughly extracted with methylene dichloride. The methylene dichloride extracts were washed successively with cold dilute sulfuric acid solution and with dilute sodium bicarbonate solution then dried over anhydrous sodium sulfate. The solvent was removed and the resulting mobile oil taken up in 100 ml. of n-hexane. The solid product obtained by cooling of the n-hexane solution was removed by filtration and recrystallized twice from n-hexane to yield 3.0 g. of 3β-(γ-cyclohexylbutyroxy)-17β-hydroxy-17α-ethynyl - 5 - androstene, M. P. 108.8–110.4° C. (corr.); $[\alpha]_D^{25} = -81.2° \pm 0.3°$ (1% in chloroform).

*Analysis.*—Calcd. for $C_{31}H_{46}O_3$: C, 79.78; H, 9.94. Found: C, 79.76; H, 10.25.

EXAMPLE 9

3β-cyclohexylcarboxy-17β-hydroxy-17α-ethynyl-5 - androstene was prepared from 3.14 g. of 17α-ethynyl-5-androstene-3β,17β-diol and 4.76 g. of cyclohexylcarboxylic anhydride in 25 ml. of pyridine according to the method given in Example 8. The 3β-cyclohexylcarboxy-17β-hydroxy-17α-ethynyl-5-androstene thus obtained weighed 3.04 g. and had the M. P. 175.4–178.8° C. (corr.); $[\alpha]_D^{25} = -87.5° \pm 0.3°$ (1% in chloroform).

Analysis.—Calcd. for $C_{28}H_{40}O_3$: C, 79.20; H, 9.50. Found: C, 79.36; H, 9.90.

EXAMPLE 10

*3β-(β-cyclopentylpropionoxy)-17β-hydroxy-17α-ethynylandrostane*

A cold solution of 3.1 g. of 17α-ethynylandrostane-3β,17β-diol in 10 ml. of pure, dry pyridine was treated with 3.3 g. of β-cyclopentylpropionyl chloride. The resulting solution was left standing for sixteen hours at room temperature under anhydrous conditions then poured into 600 ml. of cold water. The solid product which separated was extracted into an ether-methylene dichloride mixture and the extract washed with dilute hydrochloric acid and dilute potassium carbonate solutions. After drying over anhydrous magnesium sulfate, the organic extract was evaporated to dryness and the residual oil dissolved in a 20% ether-80% n-pentane mixture. This solution was chromatographed on a column containing 300 g. of silica gel and the column was eluted with successive 500 ml. portions of 20% ether-n-pentane mixture. Evaporation of the seventh through the eleventh eluates gave crystalline residues which were combined and recrystallized three times from n-hexane to yield 0.5 g. of 3β-(β-cyclopentylpropionoxy)-17β-hydroxy-17α-ethynylandrostane, M. P. 125.0–127.50° C. (corr.); $[\alpha]_D^{25} = -30.0° \pm 0.3°$ (1% in chlorofrom).

Analysis.—Calcd. for $C_{29}H_{44}O_3$: C, 79.04; H, 10.07. Found: C, 79.31; H, 10.14.

EXAMPLE 11

*3β-(β-cyclopentylpropionoxy)-17β-hydroxy-17α-ethynyl-5-androstene* was prepared according to the method described in Example 10, from 3.1 g. of 17α-ethynyl-5-androstene-3β,17β-diol and 3.4 g. of β-cyclopentylpropionyl chloride in 25 ml. of pyridine. There was thus obtained 0.85 g. of 3β-(β-cyclopentylpropionoxy)-17β-hydroxy-17α-ethynyl-5-androstene, M. P. 129.7–131.2° C. (corr.); $[\alpha]_D^{25} = -86.0 \pm 0.3°$ (1% in chloroform).

Analysis.—Calcd. for $C_{29}H_{42}O_3$: C, 79.41; H, 9.66. Found: C, 79.30; H, 9.65.

EXAMPLE 12

*3β,17β-(di-β-cyclohexylpropionoxy)-17α-ethynyl-5-androstene*

A mixture of 3.1 g. of 17α-ethynyl-5-androstene-3β,17β-diol and 8.9 g. of β-cyclohexylpropionic anhydride in 50 ml. of anhydrous pyridine was refluxed under anhydrous conditions for eighteen hours. The clear solution was poured into a mixture of 600 g. of ice, 20 ml. of concentrated sulfuric acid and 200 ml. of water and the resulting suspension thoroughly extracted with ether. The ether extract was washed with dilute sodium bicarbonate, dried over anhydrous magnesium sulfate and evaporated to dryness. The residue was dissolved in n-pentane and poured through a chromatographic column containing 300 g. of silica gel. The column was successively eluted with nine 500 ml. portions of n-pentane and with nineteen 500 ml. portions of 5% ether-95% n-pentane. The fourteenth through the eighteenth eluates were combined and evaporated to yield a white solid. After two recrystallizations from n-pentane and a third recrystallization from alcohol, there was obtained 1.0 g. of 3β,17β-(di-β-cyclohexylpropionoxy)-17α-ethynyl-5-androstene, M. P. 114.0–115.6° C. (corr.); $[\alpha]_D^{25} = -61.0° \pm 0.2°$ (1% in chloroform). A mixed melting point with the corresponding 3-mono ester gave a substantial depression.

Analysis.—Calcd. for $C_{39}H_{58}O_4$: C, 79.27; H, 9.89. Found: C, 79.47; H, 10.06.

EXAMPLE 13

3β-[β-(4-methylcyclohexyl)propionoxyl]-17β-hydroxy-17α-ethynyl-androstane can be prepared from β-(4-methylcyclohexyl)propionic acid and 17α-ethynylandrostane-3β,17β-diol according to the method described in Example 10.

EXAMPLE 14

3β-(α-cyclopentylpropionoxy)-17β-hydroxy-17α-ethynyl-5-androstene can be prepared from 17α-ethynyl-5-androstene-3β,17β-diol and α-cyclopentylpropionic acid according to the method described in Example 10.

We claim:

1. A compound selected from the group consisting of 3β-cycloalkylacyloxy-17β-hydroxy-17α-ethynylandrostanes and 3β-cycloalkylacyloxy-17β-hydroxy-17α-ethynyl-5-androstenes wherein the cycloalkyl group is a 5–6-membered ring and the acyl group is an alkanoyl radical having from 1 to about 8 carbon atoms.

2. A 3β-cycloalkylacyloxy-17β-hydroxy-17α-ethynyl-androstane wherein the cycloalkyl group is a 6-membered ring and the acyl group is an alkanoyl radical having from 1 to about 8 carbon atoms.

3. A 3β-cycloalkylacyloxy-17β-hydroxy-17α-ethynyl-5-androstene wherein the cycloalkyl group is a 6-membered ring and the acyl group is an alkanoyl radical having from 1 to about 8 carbon atoms.

4. A 3β-cycloalkylacyloxy-17β-hydroxy-17α-ethynyl-androstane wherein the cycloalkyl group is a 5-membered ring and the acyl group is an alkanoyl radical having from 1 to about 8 carbon atoms.

5. A 3β-cycloalkylacyloxy-17β-hydroxy-17α-ethynyl-5-androstene wherein the cycloalkyl group is a 5-membered ring and the acyl group is an alkanoyl radical having from 1 to about 8 carbon atoms.

6. 3β-cyclohexylpropionoxy-17β-hydroxy-17α-ethynyl-5-androstene.

7. 3β-cyclohexylcarboxy-17β-hydroxy-17α-ethynyl-5-androstene.

8. The process of preparing a 3β-cycloalkylacyloxy-17β-hydroxy-17α-ethynylandrostane which comprises reacting 17α-ethynylandrostane-3β,17β-diol with a cycloalkylalkanoic anhydride.

9. The process of preparing a 3β-cycloalkylacyloxy-17β-hydroxy-17α-ethynyl-5-androstene which comprises reacting 17α-ethynyl-5-androstene-3β,17β-diol with a cycloalkylalkanoic anhydride.

10. The process of preparing a 3β-cycloalkylacyloxy-17β-hydroxy-17α-ethynylandrostane which comprises reacting 17α-ethynylandrostane-3β,17β-diol with a cycloalkylalkanoic acid halide.

11. The process of preparing a 3β-cycloalkylacyloxy-17β-hydroxy-17α-ethynyl-5-androstene which comprises reacting 17α-ethynyl-5-androstene-3β,17β-diol with a cycloalkylalkanoic acid halide.

12. The process of preparing a compound selected from the group consisting of 3β-cycloalkylacyloxy-17β-hydroxy-17α-ethynylandrostanes and 3β-cycloalkylacyloxy-17β-hydroxy-17α-ethynyl-5-androstenes which comprises reacting 17α-ethynylandrostane-3β,17β-diol and 17α-ethynyl-5-androstene-3β,17β-diol with a cycloalkylalkanoic acylating agent.

13. 3β-(β-cyclopentylpropionoxy)-17β-hydroxy-17α-ethynylandrostane.

14. 3β-(ω-cyclohexylcaproxy)-17β-hydroxy-17α-ethynylandrostane.

15. 3β-cyclohexylcarboxy-17β-hydroxy-17α-ethynylandrostane.

16. 3β-(β-cyclohexylpropionoxy)-17β-hydroxy-17α-ethynylandrostane.

17. 3β - (β-cyclopentylpropionoxy)-17β-hydroxy-17α-ethynyl-5-androstene.
18. 3β - (γ - cyclohexylbutyroxy) - 17β - hydroxy-17α-ethynyl-5-androstene.
19. 3β - cyclohexylacetoxy-17β-hydroxy-17α-ethynyl-5-androstene.
20. 3β - (ω - cyclohexylvaleroxy)-17β-hydroxy-17α-ethynyl-5-androstene.

References Cited in the file of this patent

UNITED STATES PATENTS

| | | |
|---|---|---|
| 2,243,887 | Serini | June 3, 1941 |
| 2,267,257 | Ruzicka | Dec. 23, 1941 |
| 2,374,369 | Miescher | Apr. 24, 1945 |
| 2,602,769 | Murray | July 8, 1952 |
| 2,611,773 | Ott | Sept. 23, 1953 |

UNITED STATES PATENT OFFICE
Certificate of Correction

Patent No. 2,830,063   April 8, 1958

Raymond O. Clinton et al.

It is hereby certified that error appears in the printed specification of the above numbered patent requiring correction and that the said Letters Patent should read as corrected below.

Column 2, line 30, for "cycylolkylalka-" read —cycloalkylalka-—; column 3, line 32, for "there" read —three—; line 36, for "79,60" read —79.60—; column 4, line 5, in the heading to Example 5, for "-17α eth-" read — -17α-eth-—; line 52, for "ofg" read —of—; column 5, line 33, for "chlorofrom" read —chloroform—; column 6, line 5, for "propionoxyl" read —propionoxy—.

Signed and sealed this 8th day of July 1958.

[SEAL]

Attest:
KARL H. AXLINE,
*Attesting Officer.*

ROBERT C. WATSON,
*Commissioner of Patents.*